United States Patent
Krol et al.

(10) Patent No.: US 9,631,652 B2
(45) Date of Patent: Apr. 25, 2017

(54) CLIP-ON MOUNTING ASSEMBLY FOR MUSICAL INSTRUMENTS

(71) Applicant: DRUM WORKSHOP, INC., Oxnard, CA (US)

(72) Inventors: Andrzej J. Krol, Wayne, NJ (US); Victor Filonovich, Clifton, NJ (US); Sergio G. Bonsignore, Ridgewood, NY (US)

(73) Assignee: DRUM WORKSHOP, INC., Oxnard, CA (US)

( * ) Notice: Subject to any disclaimer, the term of this patent is extended or adjusted under 35 U.S.C. 154(b) by 0 days.

(21) Appl. No.: 14/957,462

(22) Filed: Dec. 2, 2015

(65) Prior Publication Data

US 2016/0155432 A1 Jun. 2, 2016

Related U.S. Application Data

(60) Provisional application No. 62/086,705, filed on Dec. 2, 2014, provisional application No. 62/086,701, filed on Dec. 2, 2014.

(51) Int. Cl.

| | |
|---|---|
| *G10D 13/02* | (2006.01) |
| *F16B 2/12* | (2006.01) |
| *F16M 13/02* | (2006.01) |
| *F16B 1/00* | (2006.01) |
| *H04R 1/08* | (2006.01) |
| *G10G 7/00* | (2006.01) |

(52) U.S. Cl.
CPC ............... *F16B 2/12* (2013.01); *F16B 1/00* (2013.01); *F16M 13/022* (2013.01); *G10D 13/02* (2013.01); *G10G 7/00* (2013.01); *H04R 1/08* (2013.01); *F16B 2001/0035* (2013.01); *H04R 2201/025* (2013.01)

(58) Field of Classification Search
CPC ..... G10G 5/00; F16B 1/00; F16B 2001/0035; F16M 13/022
USPC .... 248/206.5, 443; 84/327, 329, 421, 387 A
See application file for complete search history.

(56) References Cited

U.S. PATENT DOCUMENTS

| | | | |
|---|---|---|---|
| 2015/0114205 A1* | 4/2015 | Krol ....................... | G10D 13/06 84/403 |
| 2016/0157003 A1* | 6/2016 | Krol ..................... | F16M 13/022 248/229.22 |

OTHER PUBLICATIONS

U.S. Appl. No. 62/086,701, filed Dec. 2, 2014, Krol, et al.
U.S. Appl. No. 14/957,446, filed Dec. 2, 2015, Krol, et al.

* cited by examiner

*Primary Examiner* — Todd M Epps
(74) *Attorney, Agent, or Firm* — Koppel, Patrick, Heybl & Philpott

(57) ABSTRACT

Devices that allow for the attachment of one or more accessory instruments to a host instrument are disclosed, including a mounting assembly which permits the removable attachment of one or more percussion accessory instruments to a drum hoop. In some embodiments, attachment can be accomplished at least partially via a magnetic force provided by a magnet within or attached to the mounting assembly.

20 Claims, 6 Drawing Sheets

CLIP-ON MOUNTING ASSEMBLY FOR MUSICAL INSTRUMENTS

This application claims priority to U.S. Provisional Pat. App. No. 62/086,701, entitled "SPRING-ENABLED AUDIO DEVICE MOUNTING APPARATUS" and filed on Dec. 2, 2014, and claims priority to U.S. Provisional Pat. App. No. 62/086,705, entitled "CLIP-ON MOUNTING ASSEMBLY FOR MUSICAL INSTRUMENTS" and filed on Dec. 2, 2014, each of which is fully incorporated by reference herein in its entirety.

BACKGROUND

Field of the Disclosure

The present disclosure relates generally to music devices, and more particularly to attachment of one or more instruments to another one or more instruments, and is particularly applicable to percussion instruments.

Description of the Related Art

Most songs require many different instruments, and often many musicians and composers often increase the required number of instruments even further in order to add musical depth and complexity to their compositions. However, a problem can arise in that the more instruments that a particular song calls for, the more musicians are needed, or in some instances the more complicated a single musician's performance becomes. Such a problem is sometimes particularly applicable to percussion instruments and percussionists, due to the fact that percussionists may be relied upon to play a comparatively large range of different instruments such as various types of drums, tambourines, shakers, and the like. This can be further complicated by the fact that different percussion instruments often require a significant amount of physical exertion compared to non-percussion instruments.

One way to alleviate the intense demands that may be placed upon percussionists during performances is by combining two or more of the instruments that must be played during a given song into a singular arrangement. While some devices have been created that allow accessory percussion instruments, such as snares, to be combined with and/or mounted on another percussion instrument, they are often time-consuming and more complex than necessary, and/or they are not adaptable to several types of instrument combinations. In the music industry, especially during live performance, time and adaptability can be extremely important. Given that concerts are generally given within a predefined time block and that audiences generally do not prefer long periods of time between songs, performers simply cannot afford to spend any more time and effort than is absolutely necessary in adjusting instruments between songs. Further, musicians cannot afford to spend time fixing devices that have unintentionally become displaced.

Given the above, there is a need for devices which facilitate the ability of musicians to play, assemble, adjust, and/or disassemble various combinations of instruments in a convenient and timely manner. Specifically, devices that allow various percussion accessory instruments to be quickly attached to and/or removed from a drum are needed.

SUMMARY OF THE DISCLOSURE

The present disclosure provide mounting assemblies for the attachment of additional devices to a host instrument such as a drum.

One embodiment of a mounting assembly according to the present disclosure can include a body with a connection portion and one or more branches, the connection portion shaped to define a chamber. One or more percussion accessory instruments can be connected to one or more of the branches. A magnet can be included in the chamber.

Another embodiment of a mounting assembly according to the present disclosure can include a body stem including a connection portion, and a body branch attached to the body stem. A percussion accessory instrument can be connected to the body branch using a connection means.

Another embodiment of a mounting assembly according to the present disclosure can include a body with a chamber, one or more percussion accessory instruments attached to the body, and a magnet in the chamber. The mounting assembly can also include connection means defining a slot below the chamber, with the magnet exposed through the slot and the bottom of the chamber, and with the connection means configured to engage a drum hoop.

These and other further features and advantages of the disclosure would be apparent to those skilled in the art from the following detailed description, taken together with the accompanying drawings, in which:

DETAILED DESCRIPTION

The present disclosure is directed to devices that facilitate the simple and timely combination of two or more musical instruments. Specifically, devices are disclosed that allow a smaller instrument, such as a percussion accessory instrument, to be removably attached to a larger instrument, such as a larger drum, in order to facilitate the simultaneous playing of the two or more instruments by a single individual. In some aspects, the attachment can be made via the use of one or more magnetic elements without the need for additional tools.

It is understood that when an element is referred to as being "on" another element, it can be directly on the other element or intervening elements may also be present. Furthermore, relative terms such as "inner", "outer", "upper", "top", "above", "lower", "bottom", "beneath", "below", and similar terms, may be used herein to describe a relationship of one element to another. Terms such as "higher", "lower", "wider", "narrower", and similar terms, may be used herein to describe relative relationships. It is understood that these terms are intended to encompass all relationships which could be reasonably conveyed by their use.

Although the terms first, second, etc., may be used herein to describe various steps, elements, components, regions and/or sections, these steps, elements, components, regions, and/or sections should not be limited by these terms. These terms are only used to distinguish one step, element, component, region, or section from another. Thus, unless expressly stated otherwise, a first step, element, component, region, or section discussed below could be termed a second step, element, component, region, or section without departing from the teachings of the present disclosure.

The term "percussion accessory instrument" and any variant of this term are used herein to describe instruments of a small and/or simple nature that are often played in a percussion style manner and/or are used to supplement other percussion instruments. Some exemplary percussion accessory instruments include but not are limited to jingles, shakers, snakes, and similar.

The term "jingle" and any variant of this term are used herein to describe percussion accessory instruments that comprise small metal discs or similar which are configured to produce rattling-type sounds, such as the discs that produce the noise emitted by a shaken tambourine.

Figure 1:
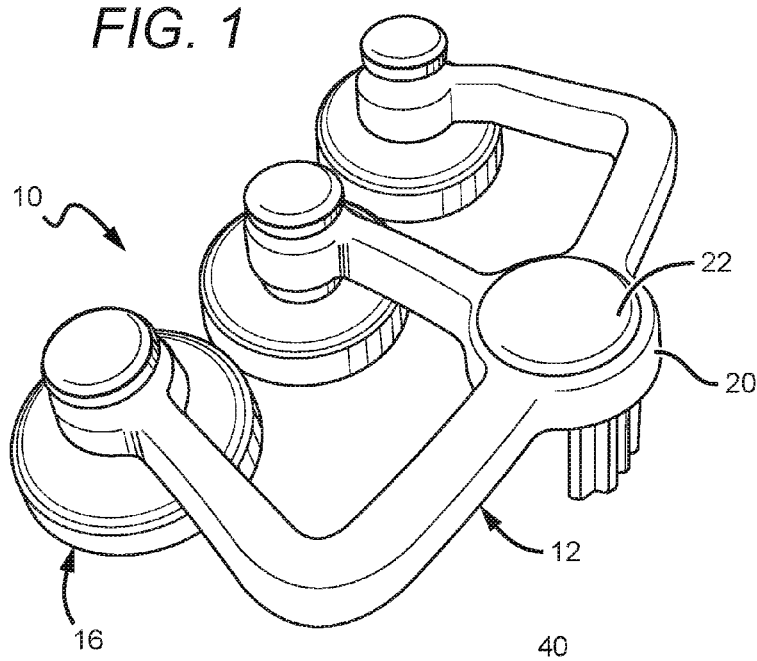
FIG. 1 is a perspective view of a mounting assembly according to one embodiment of the present disclosure.
Figure 2:
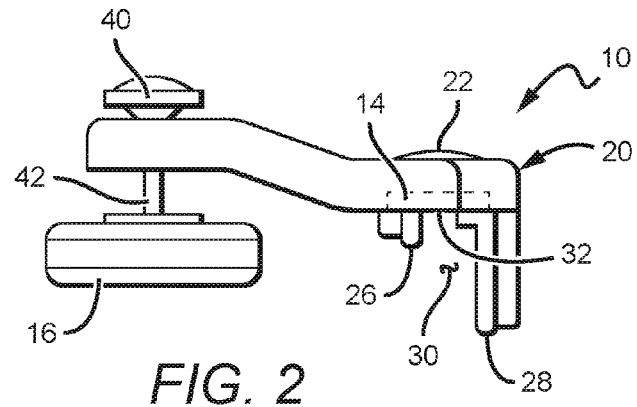
FIG. 2 is a side view of the mounting assembly shown in FIG. 1.
Figure 3:
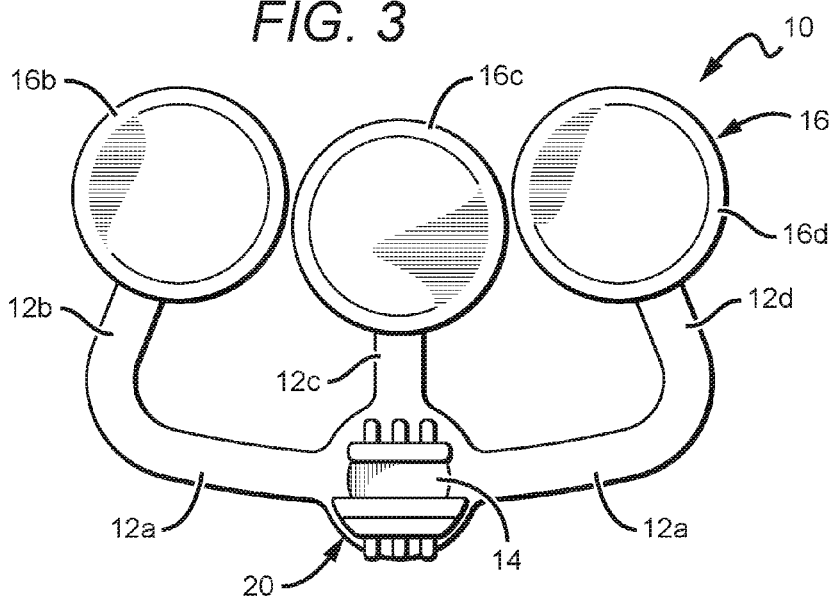
FIG. 3 is a bottom view of the mounting assembly shown in FIG. 1.
Figure 4:
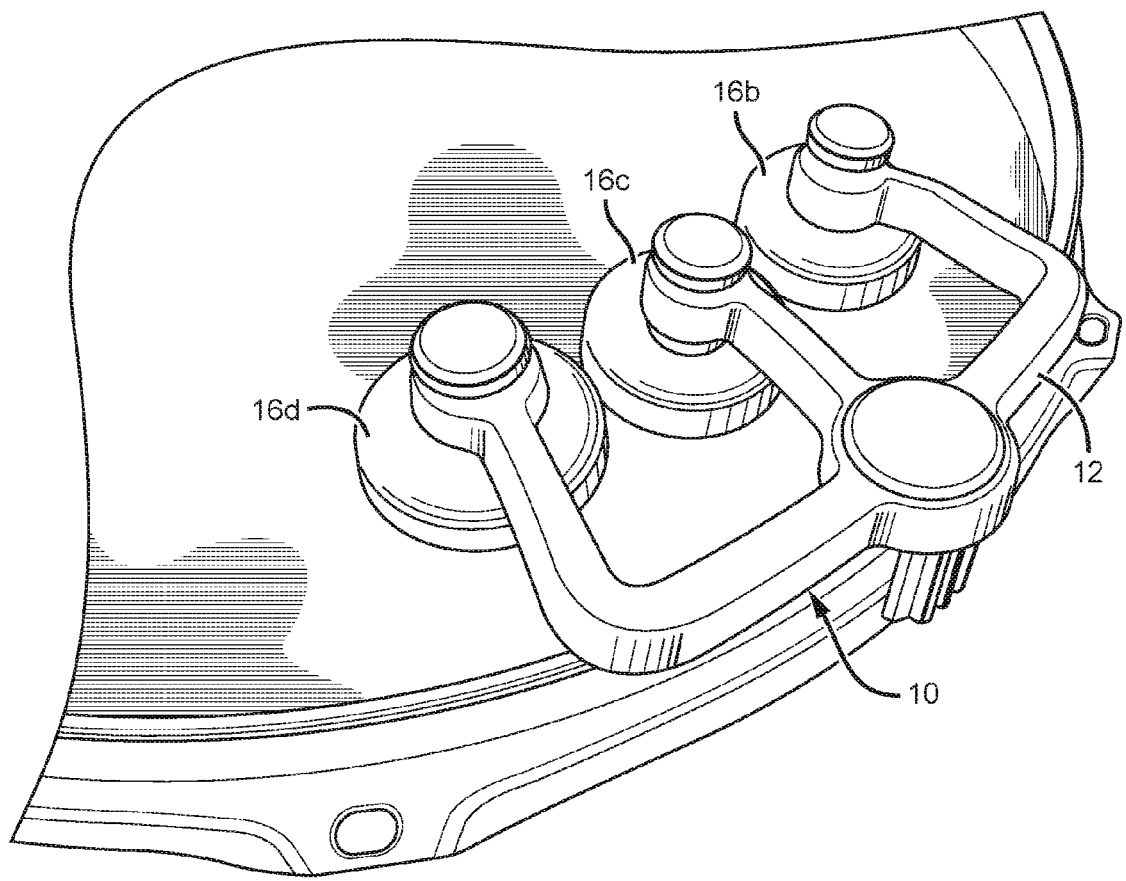
FIG. 4 is perspective view of the mounting assembly shown in FIG. 1 attached to a host instrument.
Figure 5:
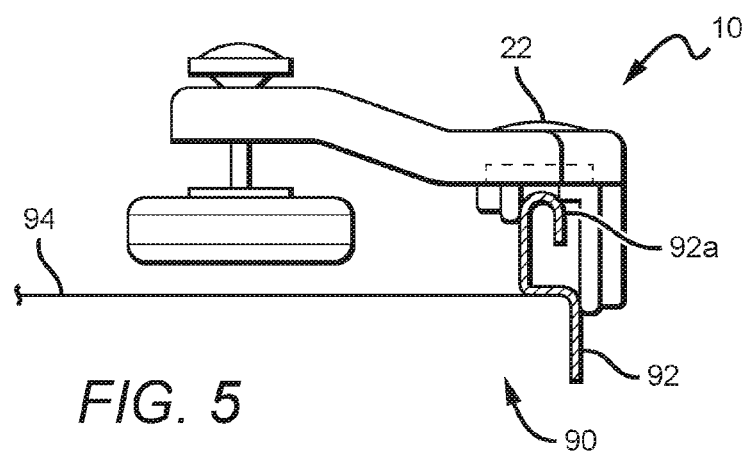
FIG. 5 is a side view of the mounting assembly shown in FIG. 1 attached to a host instrument.

FIGS. 1-3 are perspective, side, and bottom views of a mounting assembly 10 according to the present disclosure, while FIGS. 4 and 5 are perspective and side views of the mounting assembly 10 mounted on a drum 90. In the embodiment shown, the clip-on mounting assembly 10 includes a body 12, a magnet 14, and one or more percussion accessory instruments 16. In this specific embodiment, the body 12 includes one stem 12a and three branches 12b,12c, 12d each with a respective percussion accessory instrument 16b,16c,16d. The percussion accessory instruments 16 are shown as shakers, although it is understood that many different types of percussion accessory instruments can be used.

The body 12 can also include a connection portion 20. The connection portion 20 can contain many components which can be used for connecting the mounting assembly 10 to an instrument, such as the drum 90 shown in FIGS. 4 and 5. In this embodiment the mounting assembly 10 clips onto the host instrument, although many different connection types are possible.

The magnet 14 can be included in many different parts of the mounting assembly 10. In the FIGS. 1-5 embodiment, the magnet 14 is specifically included in the connection portion 20, and more specifically can be included within a chamber 22 of the connection portion 20. The chamber 22 is shown as lacking a bottom (as best seen in FIG. 3, where the magnet 14 is exposed). This design can enable a more secure connection between the host instrument (e.g., the drum 90 including drum hoop 92 and drum head 98) and the mounting assembly 10 and connection portion 20. This more secure connection can occur because of a "line-of-sight" between the magnet and the device to which it is attaching, and/or the magnet being at least partially directly over the device. This can prevent at least some interference from other elements which may be between the magnet and connection surface. It is understood, however, that chambers according to the present disclosure can optionally include a bottom. In this embodiment, instead of being secured by a chamber bottom, the magnet is secured by two connection arms 26,28; in this case, the magnet 14 rests on a top surface of each of the connection arms 26,28. Many different embodiments are possible.

The connection arms 26,28 can assist in connecting the connection portion 20 of the mounting assembly 10 to a host instrument such as a drum. The connection arms 26,28 can be shaped to collectively define a slot 30 into which a drum hoop 92 of the drum 90 can fit. For instance, one connection arm (in this instance the connection arm 26) can be located so as to engage a first surface of the host instrument (e.g., an inner surface of the drum hoop 92), while the second connection arm (in this instance the connection arm 28) can be located so as to engage a second surface of the host instrument (e.g., an outer surface of the drum hoop 92). The connection arms 26,28 can thus clip onto the host instrument, such as by engaging opposing surfaces of a drum hoop. Mounting assemblies according to the present disclosure can be designed to connect to many different types of drum hoops, including but not limited to flanged drum hoops. Further, mounting assemblies and slots such as the slot 30 can be designed to connect to many different sizes of drum hoops. Slots according to the present disclosure can be many different sizes, with exemplary slot sizes being between about 0.10 cm to 2.00 cm, and/or about 0.20 cm to about 1.00 cm, and/or about 0.25 cm to about 0.75 cm, and/or about 0.60 cm Further, the connection arms 26,28 can also be shaped to collectively define one or more channels within the slot 30, which can assist in accommodating different shapes. For instance, in the specific embodiment shown, the connection arms 26,28 are shaped to define a channel 32 which can be shaped to accommodate a top portion of the drum hoop 92. Channels such as the channel 32 can be many different sizes; for instance, some such channels can be about 0.10 cm to about 1.00 cm, and/or about 0.25 cm to about 0.75 cm, and/or about 0.5 cm. In some embodiments, a channel can have about the same width as a slot, and in some embodiments the slot can be wider than the channel. Many different embodiments are possible.

In FIGS. 4 and 5, the drum hoop 92 is shown as including a rolled top portion 92a, and the channel 32 is shaped to accommodate this rolled top portion 92a. Similar drum hoops are shown and described in U.S. Pat. No. 8,563,841 to Good and entitled "Safety Hoop for Drum," and U.S. patent application Ser. No. 13/694,519 to Good and entitled "Precision True Hoop for Drum", each of which is fully incorporated by reference herein in its entirety. Mounting assemblies according to the present disclosure can be designed to fit many different types of drum hoops, including any type of flanged drum hoop.

It is understood that the connection arms 26,28, and thus slots and/or channels defined thereby, can be many different shapes for accommodating many different types of host instruments and portions thereof. Further, connection arms, such as the connection arms 26,28, can be designed to secure mounting assemblies in additional manners. For instance, in the specific embodiment shown, the connection arm 28 is longer than the connection arm 26, which allows the connection arm 28 to engage a lower portion of the drum hoop 92. Further, inside surfaces of one or both connection arms, such as the connection arms 26,28, can be curved and designed to fit the curvature of an annular drum hoop. Many different designs are possible.

Mounting assemblies which include magnets can be particularly suited for connection to metallic portions of a host instrument. In the specific embodiment shown by FIGS. 1-5, the magnet 14 is placed in proximity to a metallic drum hoop. In addition to the mechanical forces holding the mounting assembly 10 in place, the magnetic force due to the presence of the magnet 14 can provide an even more secure connection (note that while the embodiment shown includes a metallic drum hoop, devices according to the present disclosure can be mounted to many different other devices using magnetic force, such as that caused at least in part by a magnet such as the magnet 14). Such a connection can prevent undesired movement of the mounting assembly 10 during playing of the drum 90, while still enabling relatively easy adjustment or removal by a user. While in the embodiment shown the magnet 14 is placed in close proximity to the drum hoop 92, it is understood that in other embodiments it may be nearer to or further from a host instrument, or may be in physical contact with a host instrument portion such as the drum hoop 92.

It is understood that mounting assemblies according to the present disclosure may not include a magnet and may simply involve a clip-type or other physical types of connection. For instance, the connection arms 26,28 could be angled inward such that when a drum hoop such as the rim 92 is inserted in the slot 30, the connection arms are displaced outwardly but apply pressure inwardly on the drum hoop. Many different embodiments are possible, and it is understood that these physical connection means can be used in combination with each other and/or other means such as the magnet means described above.

The connection portion 20, by itself and/or in conjunction with other elements, can hold the mounting assembly 10 in a position so as to enable actuation of the one or more percussion accessory instruments 16. For instance, in the specific embodiment shown, the body 12 and branches 12b,12c,12d are generally horizontally shaped such that the percussion accessory instruments 16 are slightly above a drum head 98 of the drum 90, such that when the drum head 98 is actuated it vibrates and in turn actuates the percussion accessory instruments 16. It is also understood that the mounting assembly can be shaped such that the percussion accessory instruments 16 are actually on a surface such as that of the drum head 98, in which case the percussion accessory instruments 16 will also be actuated upon actuation of the host instrument. The other embodiments described herein can also include such positioning of percussion accessory instruments on or above a drum head.

The mounting assembly 10 can be designed so as to enable movement of percussion accessory instruments mounted thereto, as movement is often necessary for the percussion accessory instruments to produce the desired sound. In the embodiment of FIGS. 1-5, the percussion accessory instruments 16 are connected to caps 40, which are on an upper side of the branches 12b,12c,12d, by fasteners 42. The fasteners can be, for example, screws, pins, other mechanical fasteners, or the like. The fasteners 42 can run through the branches 16b,16c,16d and may not be secured thereto vertically and may only be secured loosely horizontally, such that the fasteners 42, percussion accessory instruments 16, and caps 40 can move vertically and horizontally to produce a desired sound. It is understood that in different embodiments the connection between the fasteners 42 and the body 12 and/or caps 40 can be more or less secure in different directions.

Further, some embodiments of the present disclosure do not utilize caps such as the caps 40. Instead, fasteners can be connected to the body 12 such as the branches 12b,12c,12d. In one such embodiment a connection between fasteners and a body is rotatable, enabling rotational movement of percussion accessory instruments (e.g., to the left and right and into and out of the page in FIG. 2). Other embodiments can utilize springs for oscillatory, vertical, and/or horizontal movement (one such embodiment being shown in FIGS. 8 and 9 below). In some embodiments, one or more percussion accessory instruments are placed in proximity to one another and are capable of movement (e.g., side to side movement) such that two or more percussion accessory instruments may contact one another, which can produce a desired sound in place of or in addition to the percussion accessory instrument striking a drum head. Many different connections and movement types are possible.

Use of removable fasteners can also enable the substitution of different percussion accessory instruments. For instance, utilization of a removable cap/screw combination can allow for the replacement of one or all of the percussion accessory instruments 16 with a different type of percussion accessory instrument. Permanent fasteners, on the other hand, may be more secure and less prone to unintended disconnection. Embodiments described above and below can be designed to accommodate replaceable percussion accessory instrument(s).

Figure 6:
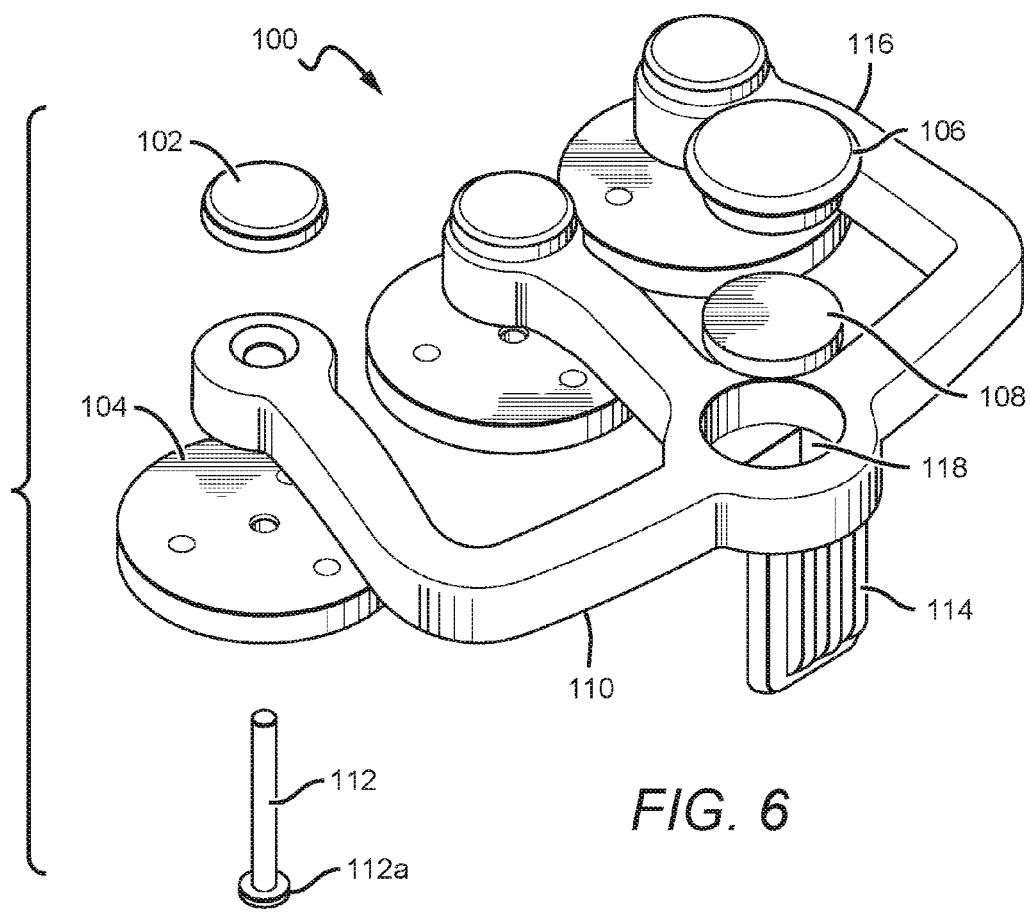
FIG. 6 is an exploded perspective view of a mounting assembly according to another embodiment of the present disclosure.
Figure 7:
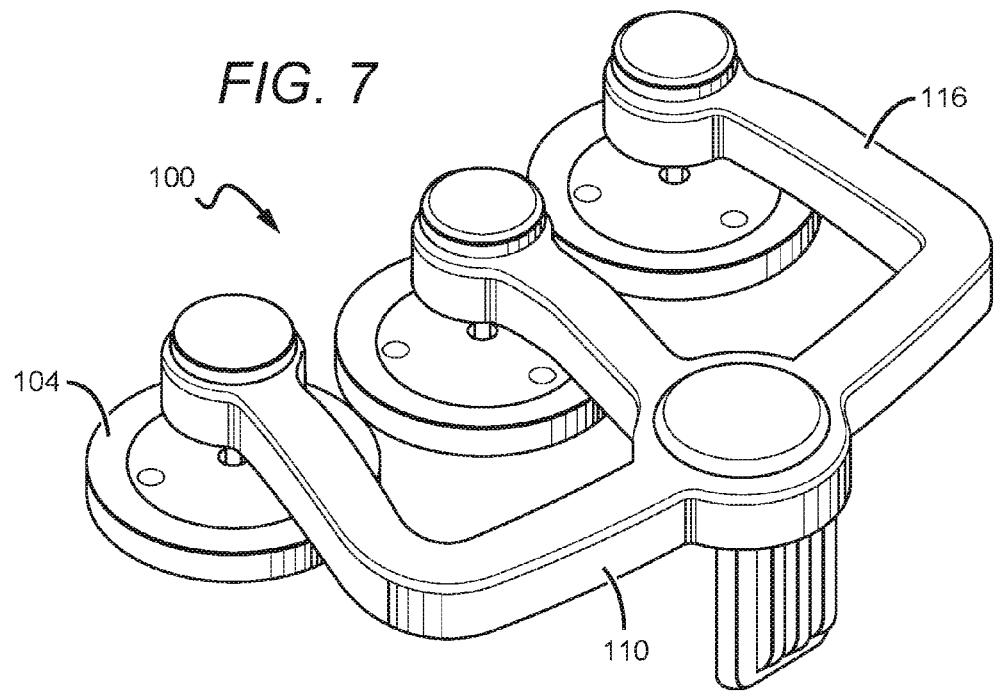
FIG. 7 is a perspective view of the mounting assembly shown in FIG. 6.

FIGS. 6 and 7 are exploded perspective and perspective views, respectfully, of one embodiment of a mounting assembly 100 according to the present disclosure. The mounting assembly 100 is similar to and contains many of the same components as the mounting assembly 10, and components of either and/or the embodiments described below can be substituted or added to the other. In the embodiment shown, the mounting assembly 100 includes a body 110, a magnet 108, and one or more percussion accessory instruments 104, with the specific embodiment shown including three jingles, which can produce a tambourine-like sound. It is understood that fewer or more components can be used, and that the jingles 104 can be replaced with many different types of percussion accessory instruments as previously described. Further, while the body 110 as shown includes three arms 116 corresponding to the three percussion accessory instruments 104, any number of arms and/or many different body shapes can be used.

Each of the jingles 104 (or other types of percussion accessory instruments) can be attached to the body 110 in any number of manners. In the specific embodiment shown by FIGS. 6 and 7, a fastener 112 is passed through a hole in the jingle 104 (as shown, an axial hole, although other placements are possible) and the body 110 (in the specific case shown, through the end of one of the arms 116), and connected to a cap 102. The fasteners 112 can include heads 112a for securing the jingles 104 into place. As opposed to, for instance, shakers, where movement of the entire shaker mechanism can result in the intended noise, jingles and other tambourine-like components may be improved using separate movement of the components. For instance, passing a fastener through the top jingle portion (such as through the shown axial hole) without specifically connecting the fastener to this jingle portion can allow the top jingle portion to move separately from the bottom jingle portion, and thus produce the intended tambourine-like or other sound.

Each fastener 112 can be attached to its respective cap 102 in many different manners. In one specific embodiment, the fasteners 112 are permanently attached to the caps 102 by an adhesive such as glue. In other embodiments, other types of connections can be used, such as welding, soldering, a screw connection, clamps, or other fastening means. As previously described, both nonpermanent and permanent fastening means can result in different benefits.

As previously described with regard to FIGS. 1-5, embodiments of the present disclosure can be connected to a drum hoop. These attachments can be secure enough so as not to move during playing of the drum, yet still easy to remove for the user. In the embodiment shown in FIGS. 6 and 7, a magnet 108 is used. The magnet 108 can be placed within a chamber 118 of the body 110. Inclusion of a chamber such as the chamber 118 can result in the magnet 108 and other instrument (e.g., the rim of a drum) being in closer proximity to one another, thus increasing the magnetic connection between the two and, thus, the secureness of the connection. Further, also as previously described, the chamber can be bottomless and/or include a hole at its bottom, which can increase the attraction between the mounting assembly 100 and the host instrument (e.g., the drum hoop of a drum). Such a hole can be smaller than the magnet such that the chamber 118 prevents the magnet from falling out, or the hole can be as large as or larger than the magnet, with another component (such as the connection arms 26,28 from FIGS. 1-5) preventing this. It is understood that chambers such as the chamber 118 can be included in the above and below embodiments, including but not limited to the embodiment of FIGS. 1-5.

Figure 8:
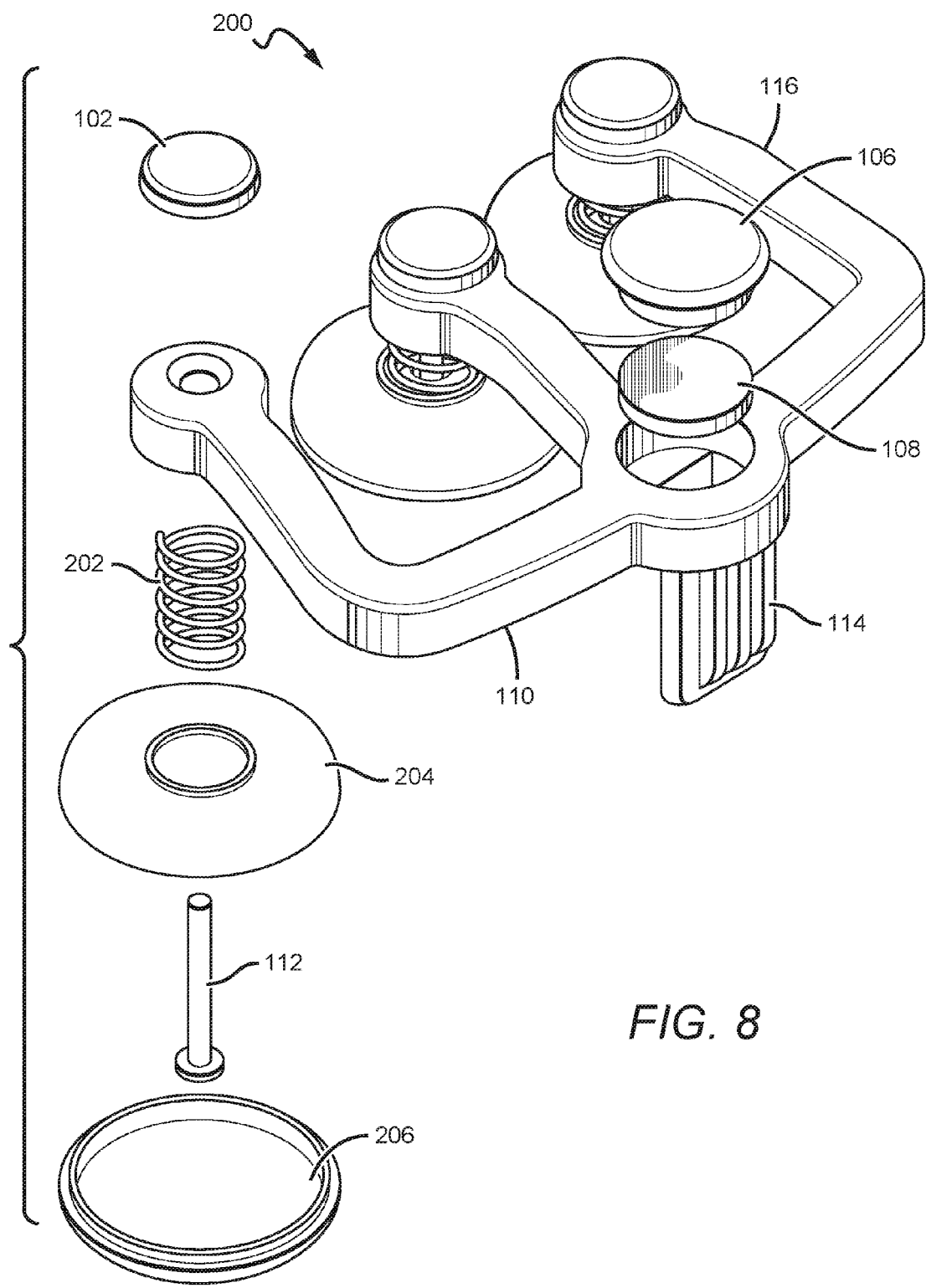
FIG. 8 is an exploded perspective view of a mounting assembly according to yet another embodiment of the present disclosure.
Figure 9:
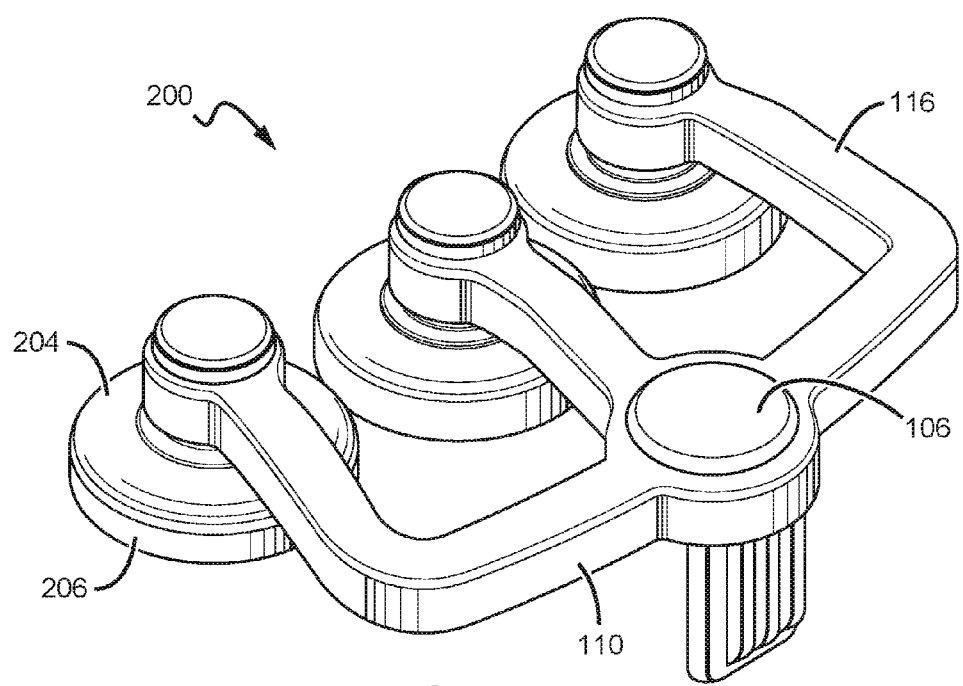
FIG. 9 is a perspective view of the mounting assembly shown in FIG. 8.

FIGS. 8 and 9 show another embodiment of a mounting assembly 200 according to the present disclosure. The mounting assembly 200 is similar to and contains many of the same components as the mounting assembly 10 (from FIGS. 1-5) and the mounting assembly 100 (from FIGS. 6 and 7), and components of different mounting assemblies can be substituted or added to others. In FIGS. 8 and 9, components similar to or the same as those from FIGS. 6 and 7 are denoted with the same indicator numeral.

Similar to the mounting assembly 10 shown in FIGS. 1-5, the mounting assembly includes percussion accessory instruments which, in this specific embodiment, constitute shakers. Here, the shaker comprises a shaker top 204 and a shaker bottom 206. Shaker elements such as shots, pellets, beans, or the like can be placed between the shaker top 204 and shaker bottom 206, and the shaker top 204 and shaker bottom 206 permanently connected to one another, such as with glue.

The mounting assembly 200 and other assemblies according to the present disclosure can include a spring 202 (note that while only one spring 202 is shown in this exploded view, springs can be included with all of the shakers shown and/or in other embodiments described herein not including springs). The spring 202 can be located in different areas. In the specific embodiment shown, the spring 202 is located between the shaker top 204 and the body 110 (specifically in this embodiment between the shaker top 204 and one of the branches of the body 110). The use of springs such as the spring 202 can facilitate oscillatory movement of each shaker, which may produce a sound that differs from non-spring versions, such as a sound that is drawn out over a longer period of time due to the oscillatory motion.

Figure 10:
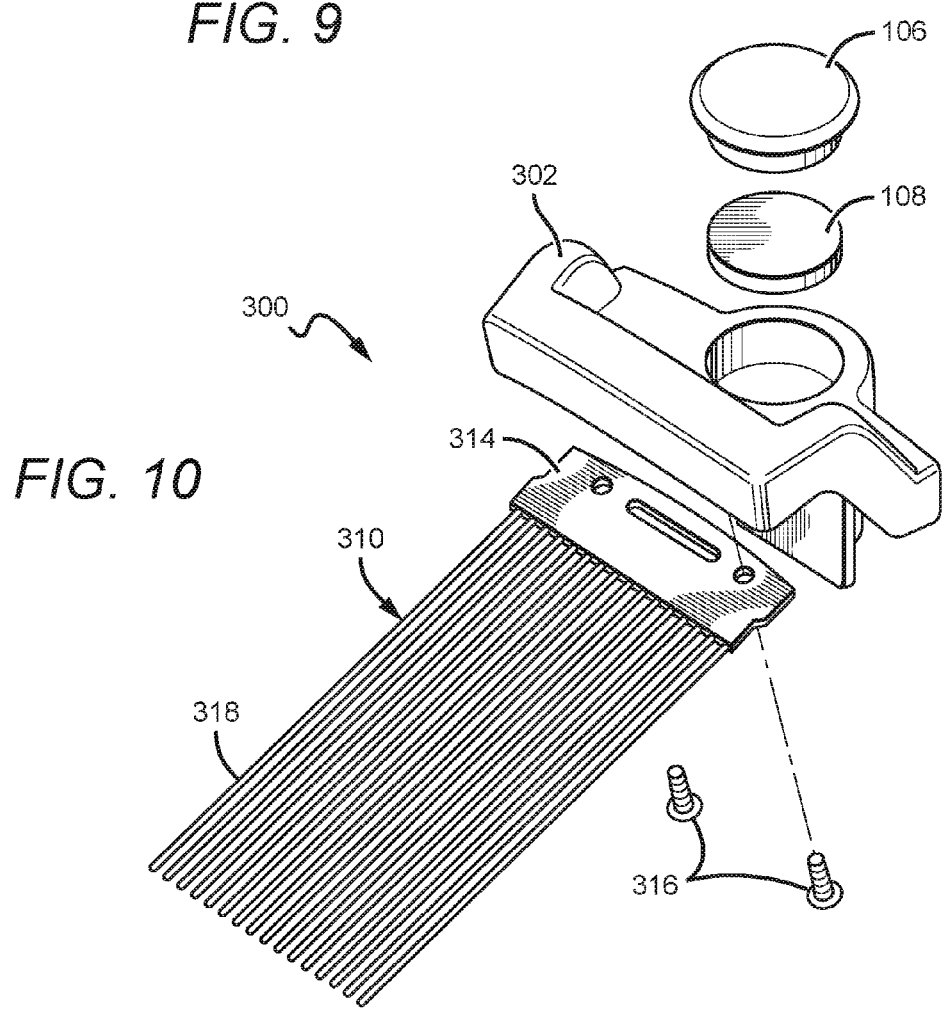
FIG. 10 is an exploded perspective view of a mounting assembly according to yet another embodiment of the present disclosure.
Figure 11:
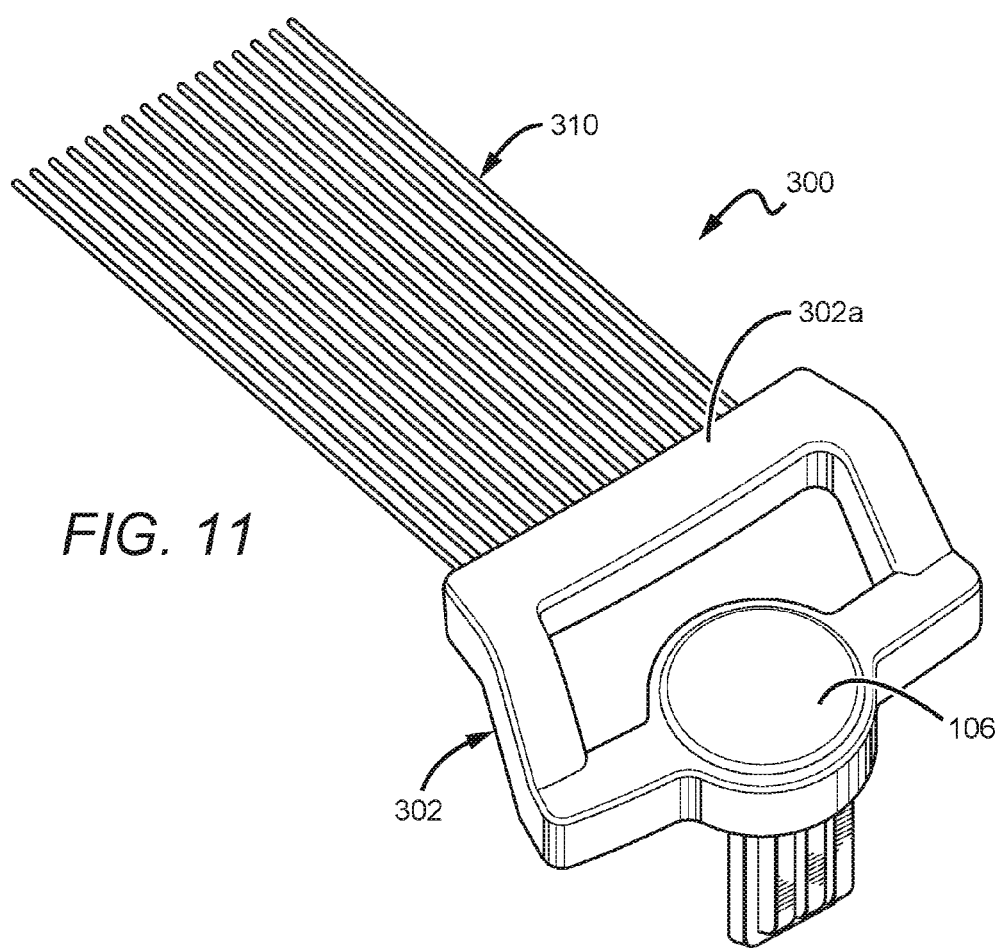
FIG. 11 is a perspective view of the mounting assembly shown in FIG. 10.
Figure 12:
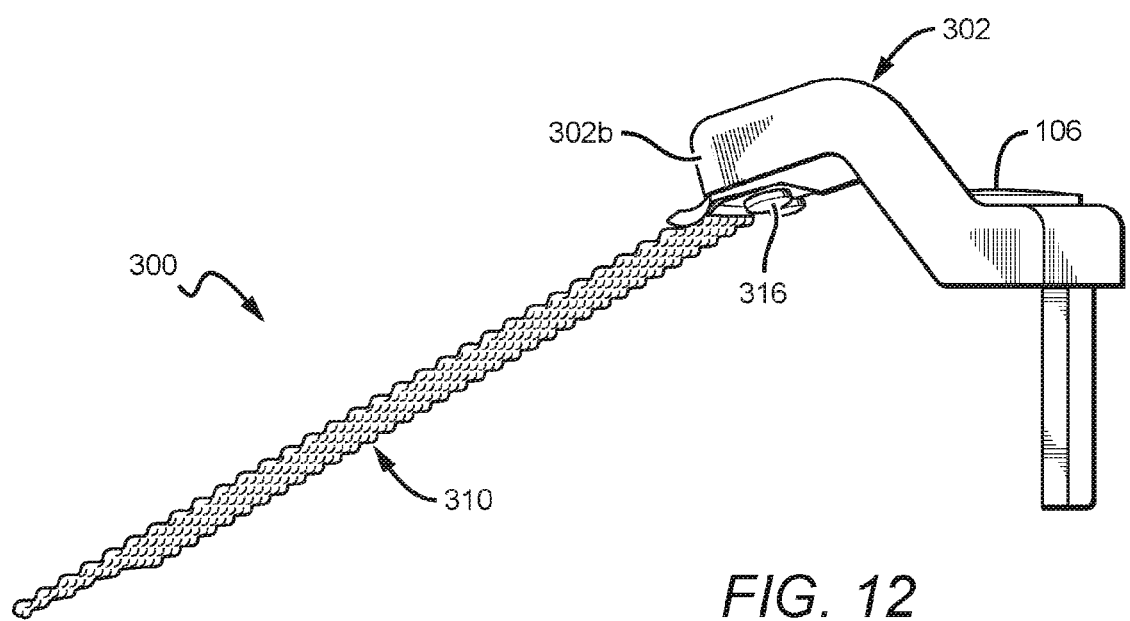
FIG. 12 is a side view of the mounting assembly shown in FIG. 10.

FIGS. 10-12 show exploded perspective, perspective, and side views of a mounting assembly 300 according to the present disclosure. As shown, the mounting assembly 300 can include the same or similar connection portions, magnet connections, and/or connection arms as described above. The mounting assembly 300 can have a body 302 that is differently-shaped than those mounting assembly bodies shown above. Specifically, the mounting assembly 300 can include with an elongated branch 302*a*. The elongated branch 302*a* can run approximately parallel to the stem of said body 302, and the body 302 can further include two or more branch connecting elements which can connect the stem to the elongated branch 302. It is understood that many different body shapes utilizing different combinations of the body elements described above can be utilized.

The mounting assembly 300 can be utilized with percussion accessory instruments requiring an elongated connection. For instance, in the specific embodiment shown, the mounting assembly 300 can include a percussion accessory instrument 310 that is a snare (although it is understood that other types of percussion accessory instruments are possible. The specific snare shown can be utilized, for example, to produce a snappy sound similar to a snare drum. Similar to the embodiment shown in FIGS. 1-5, the end of the snare elements 318 can be just above or on a drum head. Here, the snare elements 318 can also be flexible, meaning the snare elements 318 can flex such that more than just the tip of the elements may be on the drum, which may produce more of a desired sound.

The mounting assembly 300 may include a body 302 having a transverse cross-section that is narrower than some of those previously described, as can be seen best in FIG. 12. The cross-section can also include a downward angled portion 302*b*. While downward angled portions such as the downward angled portion 302*b* can be utilized with many different embodiments, it can be specifically applicable to use with elongated percussion accessory instruments such as the snare 310. As shown, the snare 310 can include elongated snare elements 318; the downward angled portion 302*b* can result in a portion of the snare elements 318 resting on a drum head (or just above the drum head). Upon actuation of the drum, the snare elements 318 can be actuated by the drum head (which itself vibrates upon actuation). This is in contrast to some other embodiments which may include one or more relatively horizontal branches from which another type of percussion accessory instrument (such as a shaker or jingle) can hang.

The percussion accessory instrument 310 can be connected to the body 302 in many ways. In one exemplary embodiment, as shown best in FIGS. 10 and 12, the snare 310 can be connected using a connection portion 314 and one or more fasteners 316, such as screws, bolts, or other fasteners known in the art. The snare 310 can be connected, for example, to the angled portion 302*b*, such as to the underside of the angled portion 302*b*, although many different embodiments and connections are possible.

While the specific embodiments described above describe mounting of percussion accessory instruments, it is understood that many different types of objects can be mounted using the devices and concepts described herein. For example, a percussion accessory instrument as described in U.S. Provisional Pat. App. No. 62/086,701 to Krol et al. and entitled "Spring-Enabled Audio Device Mounting Apparatus," filed on Dec. 2, 2014, and the corresponding utility patent application U.S. patent application Ser. No. 14/957, 446 to Krol et al. and entitled "Spring-Enabled Audio Device Apparatus," filed on Dec. 2, 2015, describe the mounting of a microphone which could be attached to a drum and/or drum hoop using the clamping devices described herein, as well as additional clamping devices and components which can be used in embodiments of the present disclosure. Each of these applications is fully incorporated by reference herein in its entirety. Other devices can be clamped by these devices as well, and the above examples should not be considered limiting.

As would be understood by one of skill in the art, the devices described above can include many different materials, including but not limited to semi-rigid and/or rigid polymers and/or metals or similar materials.

Although the present disclosure has been described in detail with reference to certain preferred configurations thereof, other versions are possible. Therefore, the spirit and scope of the disclosure should not be limited to the versions described above.

We claim:

1. A mounting assembly for connection to a musical instrument, comprising:
   a body comprising a connection portion and one or more branches, wherein said connection portion is shaped to define a chamber;
   one or more percussion accessory instruments connected to one or more of said branches; and
   a magnet in said chamber.

2. The mounting assembly of claim 1, wherein said magnet is at least partially exposed through a bottom of said connection portion.

3. The mounting assembly of claim 2, wherein said chamber is bottomless.

4. The mounting assembly of claim 1, wherein said connection portion further comprises two connection arms below said chamber and shaped to define a slot.

5. The mounting assembly of claim 4, wherein said two connection arms are configured to engage opposing sides of a portion of a drum hoop.

6. The mounting assembly of claim 4, wherein said two connection arms are shaped to define said slot such that said slot includes one or more channels.

7. The mounting assembly of claim 6, wherein said magnet is at least partially exposed through one of said channels.

8. The mounting assembly of claim 4, wherein said magnet is at least partially exposed through said slot.

9. The mounting assembly of claim 4, wherein said connection arms are configured to clip or clamp onto a portion of a drum hoop.

10. A mounting assembly for connection to a musical instrument, comprising:
    a body stem comprising a connection portion for removably attaching to a musical instrument;
    a body branch connected to said body stem;
    a percussion accessory instrument connected to said body branch by a connector, said connector comprising a fastener.

11. The mounting assembly of claim 10, wherein said connector further comprises a cap; wherein said percussion accessory instrument is at a bottom end of said fastener and said cap is at a top end of said fastener.

12. The mounting assembly of claim 11, wherein said fastener runs through a hole in said body branch.

13. The mounting assembly of claim 12, wherein said fastener is movable within said hole such that said percussion accessory instrument is vertically movable.

14. The mounting assembly of claim 10, wherein said percussion accessory instrument is a jingle or a shaker.

15. The mounting assembly of claim 10, wherein said body branch comprises an elongated portion running approximately parallel to said body stem;
    wherein said elongated portion comprises a downwardly angled portion; and
    wherein said percussion accessory instrument is connected to said downwardly angled portion.

16. The mounting assembly of claim 15, wherein said percussion accessory instrument is a snare.

17. The mounting assembly of claim 10, comprising three body branches connected to said body stem, and comprising at least one percussion accessory instrument connected to each of said three body branches.

18. The mounting assembly of claim 17, wherein each of said at least one percussion accessory instrument connected to each of said three body branches comprises a jingle or a shaker.

19. A mounting assembly for connection to a drum hoop, comprising:
    a body comprising a chamber;
    one or more percussion accessory instruments attached to said body;
    a magnet in said chamber;
    first and second connection arms below said chamber and collectively defining a slot below said chamber, wherein said magnet is exposed through said slot and a bottom of said chamber;
    wherein said first connection arm is configured to engage an inner surface of a drum hoop and said second connection arm is configured to engage an outer surface of said drum hoop.

20. The mounting assembly of claim 19, wherein said first connection arm is configured to engage an inner surface of a drum hoop and said second connection arm is configured to engage an outer surface of said drum hoop such that at least a portion of said magnet is directly over a portion of said drum hoop with no intervening elements therebetween.

* * * * *